United States Patent [19]
Johnson

[11] 3,937,482
[45] Feb. 10, 1976

[54] SELF-UPRIGHTING TOWABLE SLED FOR SNOWMOBILES AND THE LIKE

[76] Inventor: Merlin Johnson, 300 N. Fourth St., Clear Lake, Iowa 50428

[22] Filed: Oct. 1, 1973

[21] Appl. No.: 401,990

[52] U.S. Cl.................. 280/18; 280/21 R; 280/24
[51] Int. Cl.² ........................................ B62B 13/08
[58] Field of Search....... 280/18, 21 R, 24; 9/310 B, 9/1 R, 6; D12/11

[56] References Cited
UNITED STATES PATENTS

| | | | |
|---|---|---|---|
| 2,219,905 | 10/1940 | Prickman | D12/11 |
| 3,147,020 | 9/1964 | Dahl | 280/18 |
| 3,169,779 | 2/1965 | Haab | 280/18 |
| 3,380,090 | 4/1968 | Kenmuir | 9/310 B X |
| 3,600,000 | 8/1971 | Bergstrom | 280/18 |
| D161,424 | 1/1951 | Clark | 9/310 B X |

FOREIGN PATENTS OR APPLICATIONS

| | | | |
|---|---|---|---|
| 656,009 | 11/1964 | Belgium | 280/18 |
| 1,461,212 | 12/1966 | France | 280/18 |

Primary Examiner—M. Henson Wood, Jr.
Assistant Examiner—Michael J. Forman
Attorney, Agent, or Firm—Zarley, McKee, Thomte & Voorhees

[57] ABSTRACT

A self-uprighting tow sled designed to upright itself after spills. This sled generally comprises a unitary pre-formed hull having certain geometric configuration characteristics. This sled is pulled by a tow means positioned in the front thereof and below the center of gravity of the sled. As a result of the cooperative relationship between the sled, its particular geometric configuration, and the towing forces being below the center of gravity, the sled can be overturned during pulling and it will automatically upright itself.

1 Claim, 7 Drawing Figures

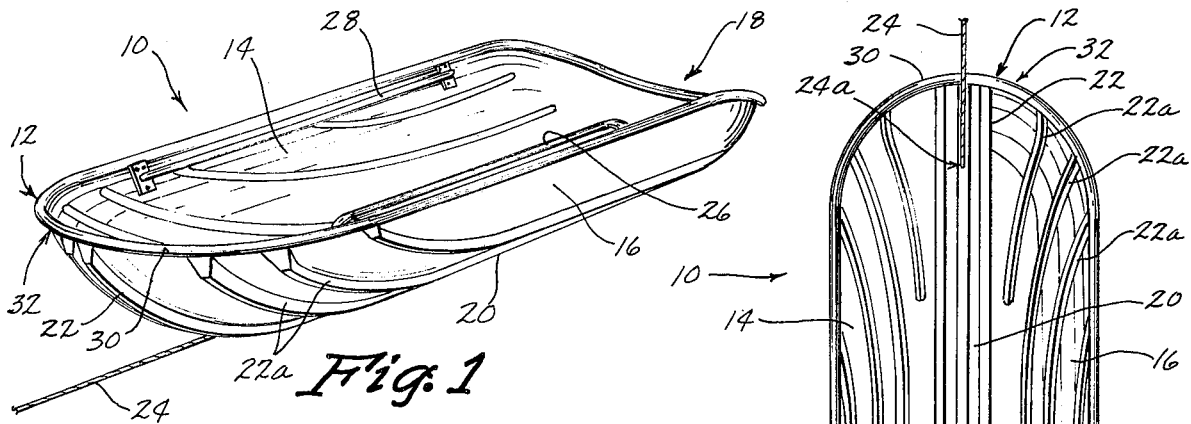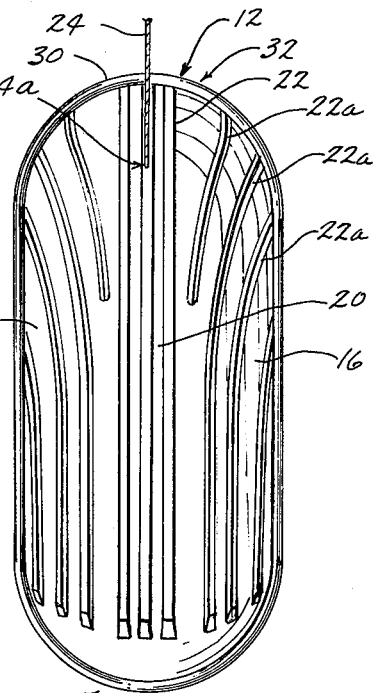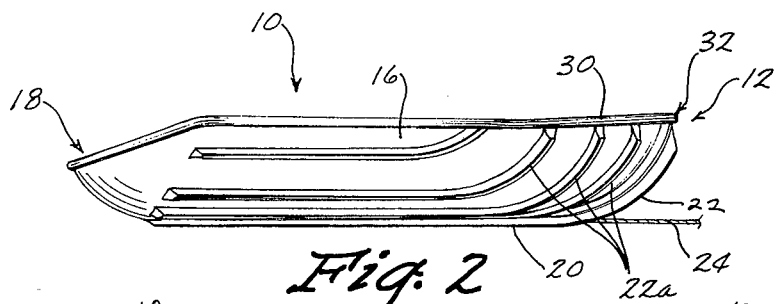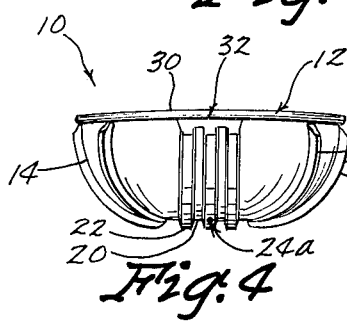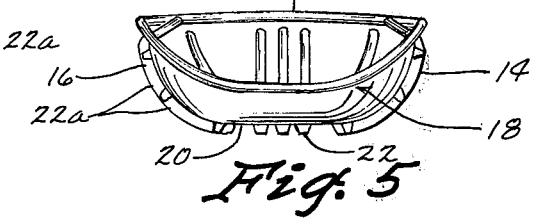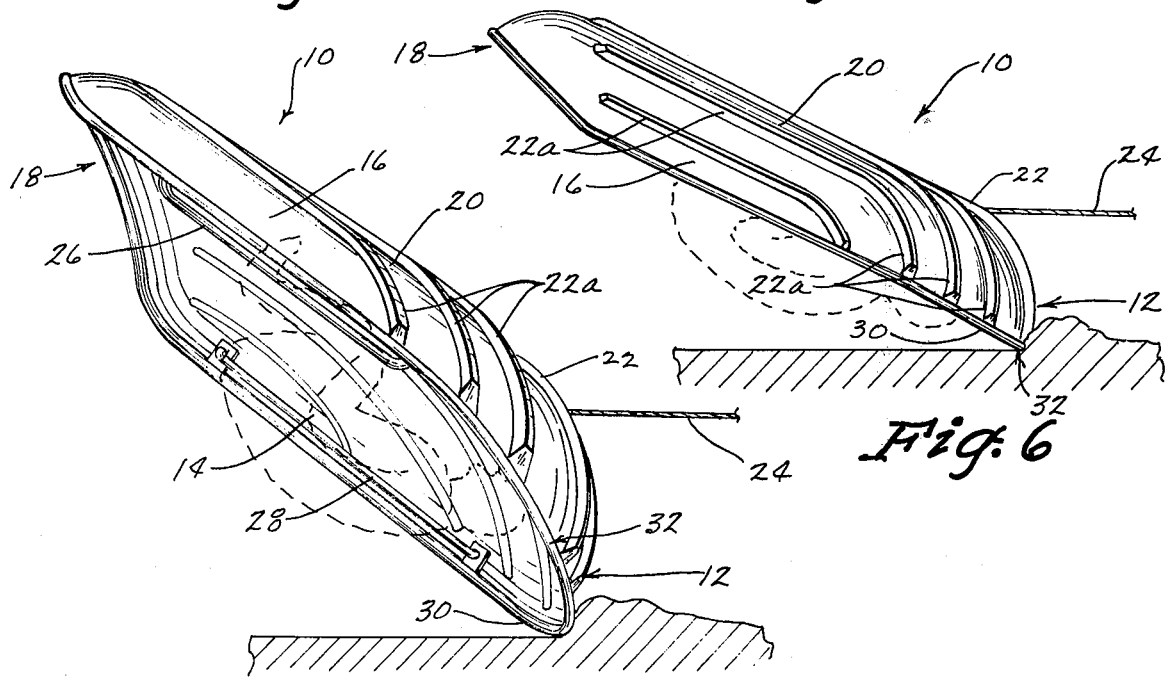

SELF-UPRIGHTING TOWABLE SLED FOR SNOWMOBILES AND THE LIKE

BACKGROUND OF THE INVENTION

With the continuing popularity of snowmobiles, there has been an increasing need for sleds and the like which can be towed by such vehicles. However, conventional toboggans and other tow sled devices lack suitable maneuverability for towing behind what are normally regarded as very maneuverable vehicles, i.e. snowmobiles. Thus, if snowmobiles pull conventional toboggans and the like and make sharp turns, the toboggan will not be able to make such turns and will almost invariably capsize itself resulting in spilling passengers on the snow. Of course, this can pose an ever-present danger to passengers in a vehicle towed behind a snowmobile. Thus there is a real need for an extremely highly maneuverable tow sled which can be pulled behind the extremely highly maneuverable snowmobile. There is also a need for a maneuverable tow sled which is not prone to capsizing. Additionally, there is a need for a towable sled-type vehicle which when capsized will automatically upright itself without endangering the passengers riding therein. This invention fulfills these needs.

Accordingly, an object of this invention is to provide a simple unitary tow sled which has all of the maneuverability characteristics of the snowmobile that is pulling the sled.

Another objection of this invention is to provide a tow sled which will not easily be capsized.

Yet, another objection of this invention is to provide a tow sled which can be purposely capsized and which will automatically upright itself by rolling on the snow, thereby preventing possible injury to passengers therein.

A method of accomplishing these and other objects will become apparent from the following description of the invention.

BRIEF DESCRIPTION OF THE DRAWINGS

FIG. 1 is a frontal perspective view of the tow sled of this invention.

FIG. 2 is a side view of the tow sled of FIG. 1.

FIG. 3 is a bottom plan view of the tow sled of FIG. 1.

FIG. 4 is a front elevational view of the tow sled of this invention.

FIG. 5 is a rear elevational view of the tow sled of this invention.

FIG. 6 is a view of a towed sled during a rollover.

FIG. 7 is a view of a towed sled during rollover as the sled is nearing its self-uprighting position.

DETAILED DESCRIPTION OF THE INVENTION

This invention relates to tow sleds for vehicles such as snowmobiles which are designed to ride over a snow-covered surface. Snowmobiles are known to have extreme maneuverability and the tow sled of this invention has maneuverability characteristics at least equal to those of the snowmobile which is towing it. Thus, the tow sled does not have a tendency to capsize upon the towing vehicle making sharp turns. Additionally, and very importantly, because of the relationship between the geometric configuration of the tow sled and the position of the tow means thereon below the center of gravity thereof, the sled can be induced to capsize and will be self-uprighting. In other words, the sled can be capsized and it will automatically return to its upright position without the necessity of stopping the towing force. This surprising feature is an important part of this invention and is believed to be a result of the cooperative relationship between the shape of the tow sled and the position of the towing forces thereon.

The tow sled 10 is comprised of a preformed hull, having a front portion 12, a rear portion 18, and oppositely disposed sides 14 and 16 and the bottom portion 20. The preformed hull can be made from a plastic, or metal, or any other suitable material. Preferably the preformed hull is of a light-weight, durable plastic, or fiberglas material.

As can be seen from the drawing, both the front portion 12 and the rear portion 18 are upwardly and laterally curved to provide a generally rounded or arcuate front and rear of the sled. As will be explained in more detail hereinafter, the rear portion 18 must dwell in a horizontal plane no higher than the plane in which the front portion dwells. As seen in FIGS. 1, 2 and 4, it is preferred that the rear portion 18 dwell in a plane inclined downwardly from the plane in which the front portion 12 dwells. If the rear portion 18 dwells in a plane higher than the plane of the front portion 12, the sled will not be self-uprighting after it capsizes.

The sled side portions 14 and 16 are transversely curved from one side to the other as can be seen in the elevational end views of FIGS. 4 and 5. Thus a cross sectional view of this sled through its width as viewed from the position of FIG. 4 would be a somewhat U-shaped configuration.

Preferably, for safety reasons, the sled has oppositely disposed grasping bars 26 and 28 positioned on the interior upward portion of oppositely disposed side portions 14 and 16.

The bottom 20 of the tow sled has a plurality of runners protruding outwardly from the under side. Preferably these runners are a part of the unitary hull design and are impressed within the sled from the inside so that the runners protrude on the outer portion of the sled leaving visible cavities from the inside bottom portion of the sled. Runners 22 comprise a plurality of positioned runners. Preferably at least three runners are in a straight line parallel relationship extending from the front 12 of the sled toward the rear thereof. It is also preferable that these are positioned equal distances from the sides 14 and 16 of the sled. Spaced apart from runners 22 and curved outwardly therefrom are curved runners 22A. Curved runners 22A can be curved at the front end thereof and can be straight or curved at the rearward end thereof. It is, however, important that curved runners 22A extend forwardly over most of the bottom side of front 12. Preferably they extend over the entire bottom side of front 12. As can be seen from FIG. 3 the curved runners 22A are on successively increasing curvatures as the runners move outwardly from the staight runners 22 towards the sides 14 and 16. Preferably there are at least four curved runners which exist in a spaced apart relationship with respect to each other, but, of course, there can be more or fewer if desired. The curved runners 22A allow the towed sled to be turned by the passengers leaning towards one side or the other to allow the curved runners to bite into the snow and turn the sled 10. Straight runners 22 allow the towed sled to be pulled in a straight-line relationship with respect to the towing vehicle without unduly swerving from one side to another. The upper edge of the preformed hull forming the tow sled of this invention is covered by a roll bar 30. Roll bar 30 is preferably generally circular in cross section and is important to the invention in that during rollovers or capsizing of the sled it prevents the edge of said sled from biting into the snow and thereby preventing the sled from uprighting itself.

The sled 10 is pulled by the towing vehicle by tow rope 24 which is secured to the sled by a tow means 24A, positioned in the front 12 of the sled below the center of gravity of the sled; but preferably means 24A is positioned sufficiently high on the front 12 of the sled so that the tow rope 24 will not ride directly on the snow. Tow means 24A can simply be an aperture positioned in the above identified location of the preformed hull through which a rope can be knotted. Alternatively, tow means 24A could be a protruding tab portion with a hole positioned therein for securing tow rope 24 thereto. However, the important feature is not the precise tow means employed, but the position of that tow means so that the towing forces will be exerted on the sled 10 at a position below the center of gravity thereof.

It has been surprisingly found that when the tow means of a sled having the particular configuration previously described herein, is positioned in the front of the sled in a position below the center of gravity thereof, the sled can be induced to capsize by transferring weight to one side thereof and surprisingly the sled will upright itself. It is believed that the sled uprights itself because of the cooperative relationship between the towing forces, the position of the towing means 24A, the roll bar 30, and the generally arcuate front edge 32 of front portion 12. As seen in FIG. 6, when the sled is capsized part of roll bar 30 hits the snow, but because of the rotary motion involved during capsizing, and the arcuate front edge 32, as well as the position of the towing force and the towing means 24A, the sled continues its roll as shown in FIG. 7 and rolls back to an upright position. Passengers in the tow sled, if they desire, can actually induce capsizing and the sled will self-upright itself.

Certain dimensional aspects of this self-uprighting tow sled are worthy of mention. Preferably the depth of the sled is at least a minimum of 10 inches. It is also preferred that the sled be at least 3 feet long. Most desirably the sled has a length-to-width ratio of two to one. When a length-to-width ratio of at least two to one has been employed this sled has been found to be most efficient from the standpoint of being self-uprighting.

What is claimed is:

1. A tow sled designed to upright itself after spills, said sled comprising, a preformed hull having front and rear portions, oppositely disposed sides and a bottom, said hull having a length equal to approximately twice the width thereof, said front portion being upwardly and laterally curved from said bottom to provide a generally rounded front portion having an upper forward edge which extends upwardly and forwardly, said rear portion being upwardly and laterally curved from said bottom to provide a generally rounded rear portion, said rear portion having an upper rearward edge extending upwardly and forwardly and the forwardmost portion of which dwells in a horizontal plane no higher than the lowest horizontal plane in which the upper forward edge of said front portion dwells, said sides being uniformly spaced apart from front to rear and transversely curved upwardly and outwardly from said bottom and having upper straight horizontal edges which merge with said upper rear and front edges, a tow means positioned on said front portion below the center of gravity and closely adjacent said bottom whereby a towline may be connected to said tow means so that said towline is disposed substantially parallel to said bottom, a roll bar means being secured to said upper edges of said front portion, said sides and said rear portion, said roll bar being substantially circular in cross section thereby preventing an edge catching on the ground when the sled is overturned, a plurality of spaced apart runners being positioned on the outside surface of said hull, each of said runners having rearward and forward ends, the forward ends of said runners terminating at said upper edges, said runners comprising straight runners and curved runners, said straight runners being in a parallel relationship with respect to each other and positioned on opposite sides of said bottom along the longitudinal centerline of said sled, the forward ends of said straight runners terminating at said upper edge of said front portion, said curved runners being laterally outwardly positioned in spaced apart relationship from said straight runners, and said curved runners having straight portions merging into forwardly positioned outwardly curved portions terminating at the upper front and side edges, said hull inside surface includes elongated cavities opposite each runner, said opposing runners and cavities being of equal length, width and depth, and elongated longitudinal extending grasping members being provided on the upper inside surface of the oppositely disposed side walls of said hull.

* * * * *